(12) United States Patent
Blecker et al.

(10) Patent No.: US 7,367,429 B2
(45) Date of Patent: May 6, 2008

(54) DEVICE FOR FEEDING OIL TO A BEARING SEAT OF A ROTATABLE SHAFT

(75) Inventors: Armin Blecker, Asslar (DE); Heinrich Lotz, Wetzlar (DE)

(73) Assignee: Pfeiffer Vacuum GmbH, Asslar (DE)

( * ) Notice: Subject to any disclaimer, the term of this patent is extended or adjusted under 35 U.S.C. 154(b) by 742 days.

(21) Appl. No.: 10/840,160

(22) Filed: May 6, 2004

(65) Prior Publication Data
US 2004/0251084 A1    Dec. 16, 2004

(30) Foreign Application Priority Data
May 13, 2003  (DE)  ................. 103 21 326

(51) Int. Cl.
*F01M 1/06* (2006.01)
(52) U.S. Cl. ........................ 184/7.1; 384/144
(58) Field of Classification Search .......... 184/26, 184/31, 6.11, 7.1; 384/144, 160, 163, 165, 384/169
See application file for complete search history.

(56) References Cited

U.S. PATENT DOCUMENTS

| | | | | |
|---|---|---|---|---|
| 5,693,217 A | * | 12/1997 | Erdmannsdoerfer et al. | .. 210/97 |
| 5,724,934 A | * | 3/1998 | Faraci et al. | ............ 123/196 R |
| 6,126,320 A | * | 10/2000 | Ichiyama | .................... 384/112 |
| 7,237,652 B2 | * | 7/2007 | Takanohashi et al. | ...... 184/6.12 |

FOREIGN PATENT DOCUMENTS

| | | |
|---|---|---|
| FR | 892490 | 1/1943 |
| GR | 662147 | 1/1949 |

\* cited by examiner

*Primary Examiner*—David M. Fenstermacher
(74) *Attorney, Agent, or Firm*—Abelman, Frayne & Schwab

(57) ABSTRACT

A device for feeding oil to a seat of a bearing (5) that supports a rotatable shaft (3) includes an annular oil reservoir (14) surrounding a seat of the bearing (5), an oil pump (8) having two spindles (10, 11) with oppositely extending, respectively feeding channels, oil delivery conduit means (20); and oil return conduit (24, 25, 26, 27) provided on axially opposite sides of the bearing seat.

4 Claims, 4 Drawing Sheets

DEVICE FOR FEEDING OIL TO A BEARING SEAT OF A ROTATABLE SHAFT

BACKGROUND OF THE INVENTION

1. Field of the Invention

The present invention relates to a device for feeding oil to a seat of a bearing that supports a rotatable shaft.

2. Description of the Prior Art

With rotatable shafts supported in oil-lubricated bearings, a continuous feeding of oil to bearing seats is insured by an oil feeding device. There exists different devices or arrangements for feeding oil, e.g., oil can be fed to bearing seats by a separately driven oil pump through tubular conduits. Also know is an arrangement with which a lower end of a rotatable vertical shaft is submerged in an oil reservoir, and a section of the shafts, which is formed as a helical thread, forms a device for feeding oil to bearing seats. For feeding oil to bearing seats from an oil reservoir, also, wicks can be used. This solution, however, does not allow to monitor the flow of oil.

In all of the above-discussed cases, a continuous and uniform feeding of oil depends on a mounting position of the rotatable shaft. In many cases it is desirable that the mounting position of a shaft is not prefixed but is variable so that the position can be adapted to a particular use. E.g., with the use of turbomolecular pumps which are equipped with rapidly rotatable rotor shafts with which a continuous and uniform feeding of oil to bearing seats is particularly important, the rotor shaft can occupy different positions dependent on a particular use of the turbomolecular pump, e.g., the rotor shaft can occupy a vertical, horizontal or overhead position.

The conventional oil feeding devices significantly limit the mounting positions the shaft can occupy. During transportation of the machines or apparatuses with oil-lubricated bearings, oil should be removed from a reservoir as a predetermined or prefixed position of the shaft cannot be maintained during transportation.

Accordingly, an object of the present invention is to provide a device for feeding oil to bearing seats of a rotatable shaft and which would insure a continuous and uniform feeding of oil and monitoring of oil flow independent on the mounting position of the rotatable shaft.

Another object of the present invention is to provide an oil-feeding device that would insure transportation of the machine and apparatuses with oil-lubricated bearings of the rotatable shafts, without removing oil from the oil reservoir.

SUMMARY OF THE PRESENT INVENTION

These and other objects of the present invention, which will become apparent hereinafter, are achieved by providing a device for feeding oil to a seat of a rotatable shaft-supporting bearing and including an annular oil reservoir surrounding the bearing seat, an oil pump having two spindles with oppositely extending, respectively, feeding channels, an oil delivery conduit, and an oil return conduit provided on axially opposite sides of the bearing seat.

The device according to the present invention insures a continuous feeding of oil to bearing seats independent on the mounting position of a rotatable shaft and the shaft-supporting bearing.

The oil flow can be monitored with conventional monitoring means. Feeding of oil without interruption independent from the position of the rotatable shaft is particularly important with rapidly rotatable shafts used, e.g., in turbomolecular pumps or ultra centrifuges. The transportation is possible without removing oil from the reservoir and without a need to retain the shaft in a predetermined position.

The novel features of the present invention, which are considered as characteristics for the invention, are set forth in the appended claims. The invention itself, however both as to its construction and its mode operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
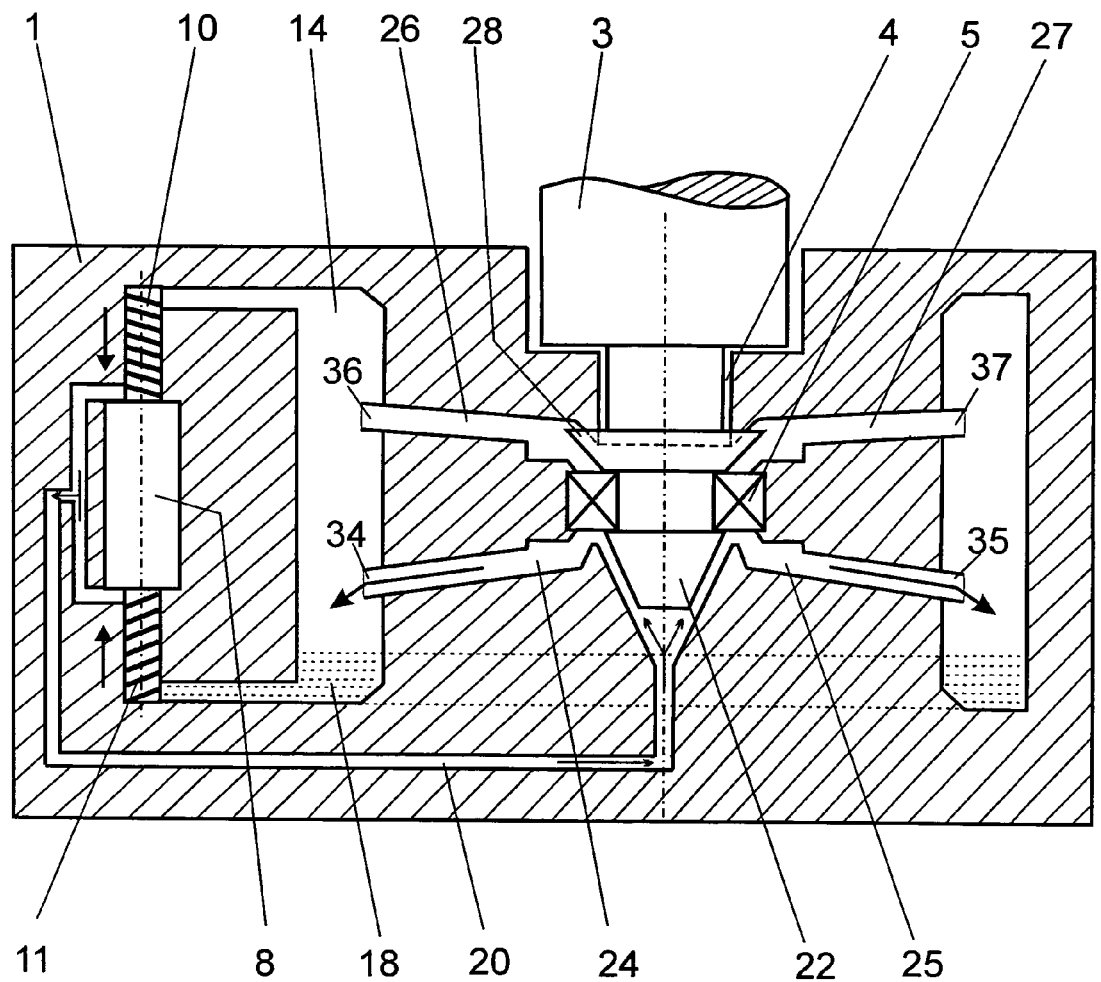
FIG. 1 a cross-sectional view of a device according to the present invention for feeding oil to bearing seats of a transversely extending rotatable shaft.

FIG. 1 shows a device according to the present invention for feeding oil to a bearing 5 that supports a transversely extending shaft 3. Other bearings, which support the shaft 3, are not shown. The oil feeding device is located in a housing 1. The oil circulation is supported by an oil pump 8. The oil pump 8 has two spindles 10, 11 with oppositely running channels. An oil reservoir 14 surrounds the bearing 5 and extends on opposite axial sides of the bearing 5. An oil level in different positions of the shaft 3 is shown with respective reference numerals 18. The oil is fed to the bearing 5 through feeding conduits 20 and a feeding cone 22. The feeding cone 22 can be replaced with others, per se, known feed elements. Return conduits 24, 25, 26, 27 feed the oil back to the oil reservoir 14. The return conduits 24, 25, 26, 27 are located on the axially opposite sides of the bearing 5. In order to prevent the return flow of oil from the reservoir, the ends 34, 25, 36, 37 of the respective return conduits 24, 25, 26, 27 extend into the oil reservoir 14. The shaft clearance 4 is sealed with a labyrinth seal 28.

Figure 2:
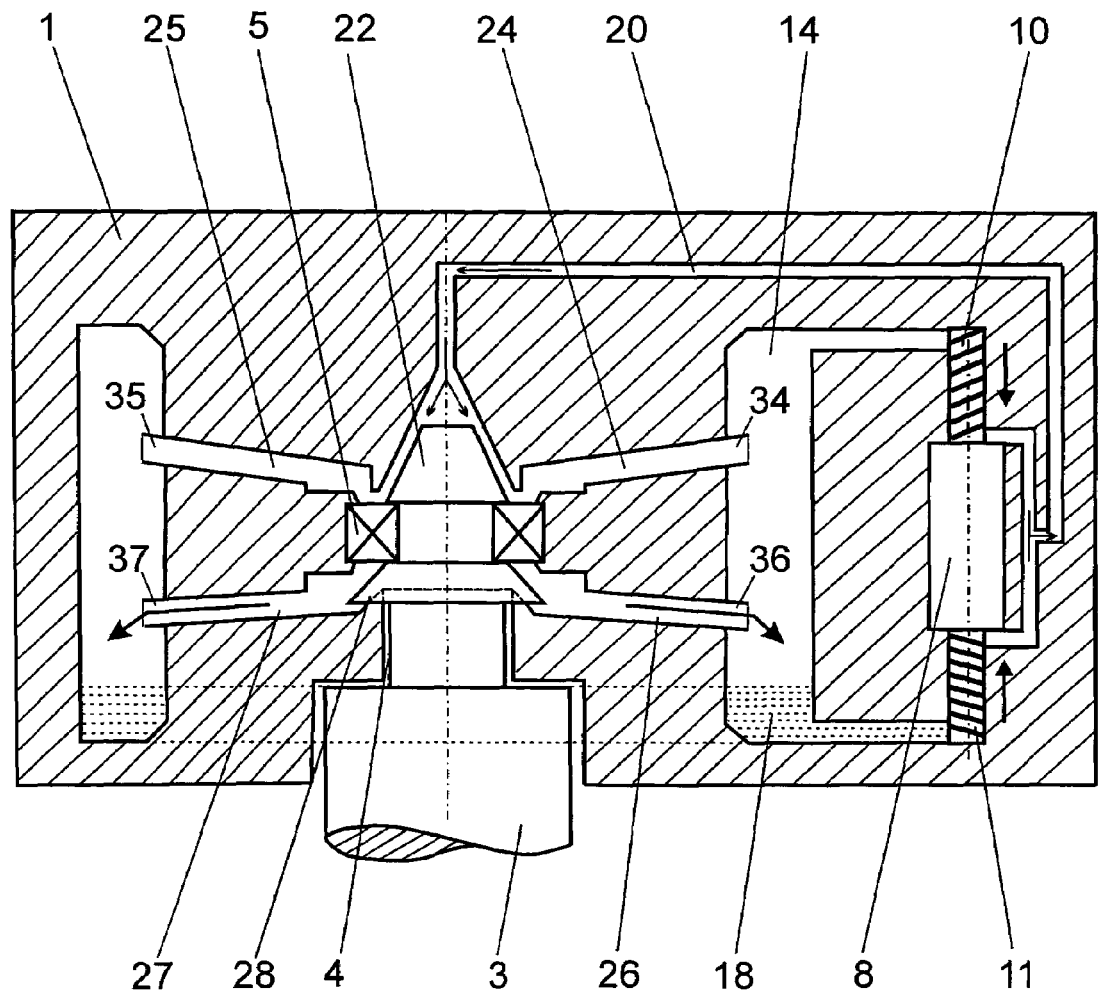
FIG. 2 a cross-sectional view of a device according to the present invention for feeding oil to bearing seats of a transversely extending rotatable shaft with an overhead drive.

In order to insure feeding of oil to the bearing seat in all of the position of the rotatable shaft 3 shown in FIGS. 1-4, the oil level 18 should be high enough to insure that an end of a spindle is always submerged in oil. This is also important for insuring that oil is fed to a respective upper bearing of the oil pump. As shown in FIGS. 1-2, with transversely extending shafts, the oil fills an annular section of an oil reservoir 14.

Figure 3:
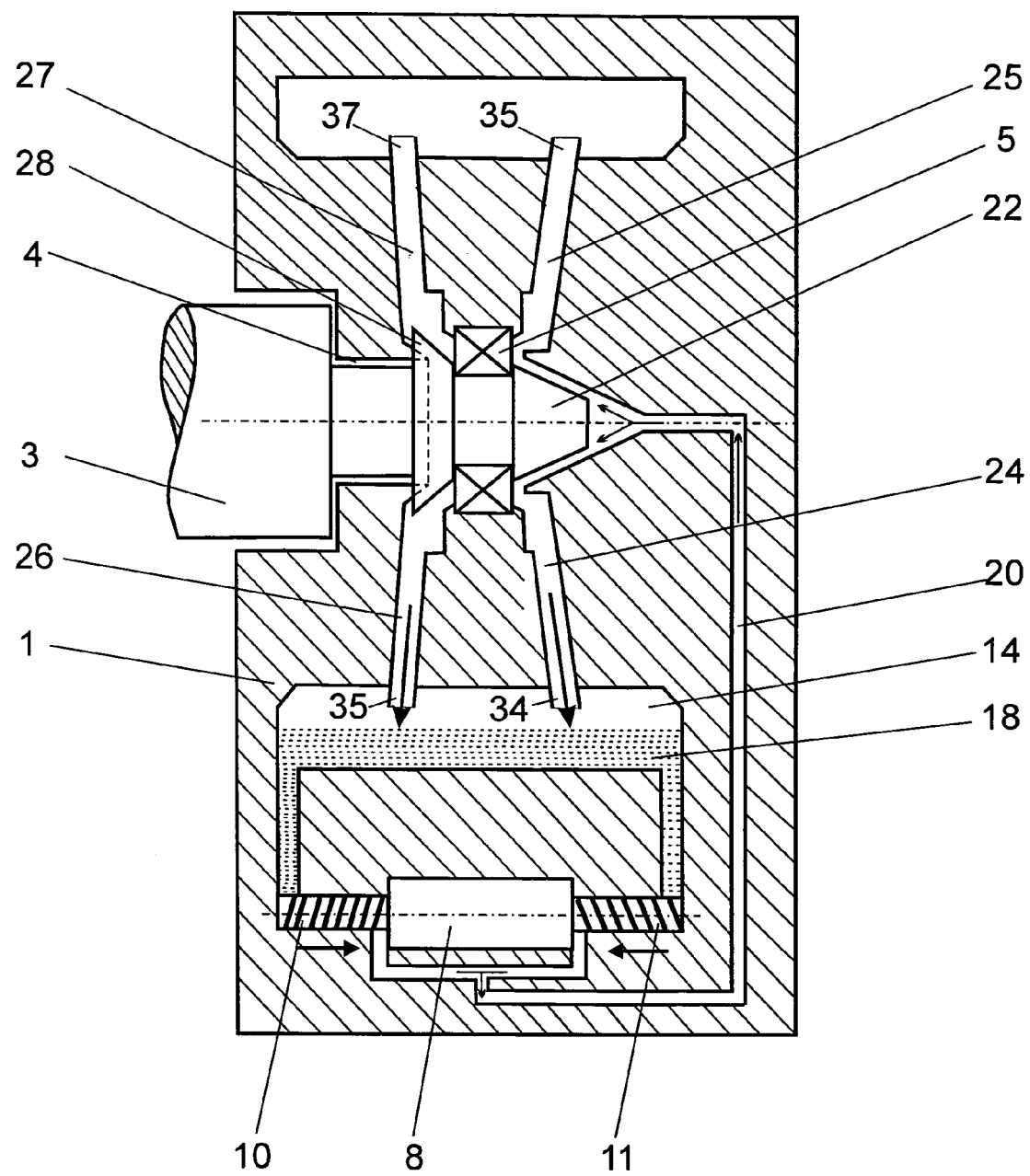
FIG. 3 a cross-sectional view of a device according to the present invention for feeding oil to bearing seats of a horizontally extending rotatable shaft.
Figure 4:
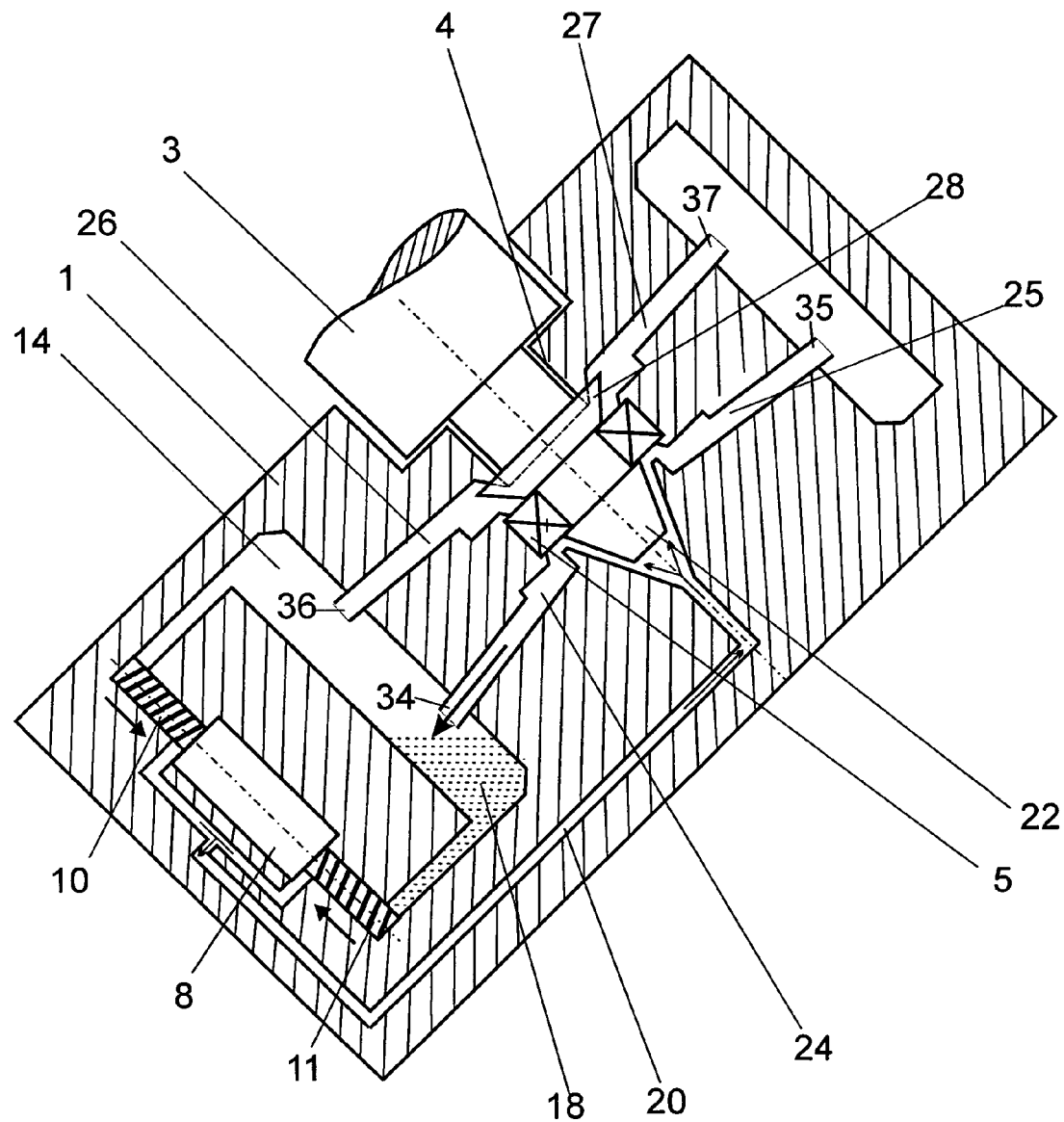
FIG. 4 a cross-sectional view of a device according to the present invention for feeding oil to bearing seats of an inclined rotatable shaft.

With a horizontally extending shaft, shown in FIG. 3, the oil is collected in a lower section of the reservoir 14. With an inclined shaft 3, as shown in FIG. 4, the oil occupies an intermediate position. Thus feeding of oil to the bearing seat is insured in all of the positions of a rotatable shaft (3).

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A device for feeding oil to a seat of a bearing (5) that supports a rotatable shaft (3), the device comprising:

an annular oil reservoir (14) surrounding a seat of the bearing (5);

an oil pump (8) having two spindles (10, 11), the two spindles (10, 11) having respectively, oppositely extending feeding channels forming inlet channels of the oil pump, at least one of the two spindles being immersed in oil in any position of the shaft, whereby feeding of oil to the bearing seat is insured in all positions of the shaft;

oil delivery conduit means (20) for delivery of oil to the bearing seat from the pump; and oil return conduit means (24, 25, 26, 27) partly (24, 25) provided on one side of the bearing seat and partly (26, 27) provided on an axially opposite side of the bearing seat.

2. A device according to claim 1, further comprising a feeding cone (22) provided at an end of the rotatable shaft (3) below the seat of the bearing (5).

3. A device according to claim 1, wherein ends (34, 35, 36, 37) of respective return conduits (24, 25, 26, 27) projects into the oil reservoir (14).

4. A device according to claim 1, further comprising a labyrinth seal (28) located between the bearing seat and a portion of a device housing (1) defining a shaft clearance (4) for sealing the shaft clearance (4).

* * * * *